United States Patent
Lavarenne

[15] 3,651,582
[45] Mar. 28, 1972

[54] METHOD OF GENERATING A NON-COLLIMATED SYNTHESIZED DISPLAY TO ASSIST IN PILOTING AN AIRCRAFT, AND SYSTEM FOR PERFORMING THE SAME

[72] Inventor: Jean Lavarenne, Villecresnes, France
[73] Assignee: Nord-Aviation Societe Nationale de Constructions Aeronautiques, Seine, France
[22] Filed: Oct. 24, 1969
[21] Appl. No.: 868,984

[30] Foreign Application Priority Data

Oct. 24, 1968 France....................................171260

[52] U.S. Cl............................................35/10.2, 235/150.22
[51] Int. Cl.........................................G09b 9/08, G06g 7/78
[58] Field of Search...............................35/10.2; 350/9, 299; 353/11–14; 235/150.22

[56] References Cited

UNITED STATES PATENTS

| | | | |
|---|---|---|---|
| 2,537,996 | 1/1951 | Hankes | 350/9 X |
| 3,039,204 | 6/1962 | Bryan et al. | 35/10.2 |
| 3,134,295 | 5/1964 | Brown et al. | 35/10.2 X |
| 3,401,228 | 9/1968 | Barnes | 35/10.2 |
| 3,418,033 | 12/1968 | Hope | 350/299 X |

*Primary Examiner*—Malcolm A. Morrison
*Assistant Examiner*—Jerry Smith
*Attorney*—Karl W. Flocks

[57] ABSTRACT

A system for providing a non-collimated synthesized display, by way of a pilot's aid, notably during the approach and precision landing phase in poor visibility.

A movable and deformable synthesized picture of the runway, as the pilot would normally see it at any time, is supplied and so correlated with a fixed reference frame on the front window of the cockpit that the overall interpretation of these two data provides the pilot with clear and intuitive indications enabling him to carry out the necessary maneuvers or providing him with confirmation of the proper functioning of an operative automation system.

11 Claims, 11 Drawing Figures

METHOD OF GENERATING A NON-COLLIMATED SYNTHESIZED DISPLAY TO ASSIST IN PILOTING AN AIRCRAFT, AND SYSTEM FOR PERFORMING THE SAME

The present invention is concerned with the piloting of aircraft and relates more particularly to a method of providing a noncollimated synthesized display, by way of a pilot's aid, notably during the approach and precision landing phase in poor visibility. The invention also relates to apparatus based on a galvanometer and optical elements, for performing this method.

Well known are display systems used as navigational aids which consist in overlaying upon the background view, through the front window of the cockpit, either an image at infinity of a runway contour or an image at infinity of certain simplified essential data. However, all these collimated information systems included under the general heading of so-called "head-up displays" (in that they allow the pilot to see useful indications without moving his eyes away from the external surroundings) all have the disadvantage inherent in collimated pictures, that is to say that in the event of a turbulent atmosphere it becomes difficult for the pilot to keep his eyes at the same time on the image projected at infinity and on the surrounding landscape owing to the relative instability which appears between these two pieces of information. Further, all these systems are costly to purchase and maintain because of the complexity of the techniques employed, and moreover their weight and bulk are considerable.

It is one object of the present invention to provide a simple method whereby a picture, of a runway notably, that is not collimated at infinity and is appropriately synthesized by suitable apparatus receiving electrical information from the flight instruments normally used aboard the aircraft, is displayed in the pilot's direct field of vision.

It is another objects of the invention to provide a simple, essentially optical system for producing, displacing and suitably deforming the picture of a runway inscribed upon the front window of the cockpit, in front of either the pilot or the co-pilot.

The subject method of this invention is characterized essentially in that a movable and deformable synthesized picture of the runway, as the pilot would normally see it at any time, is supplied and so correlated with a fixed reference frame on the front window that the overall interpretation of these two data provides the pilot with clear and intuitive indications enabling him to carry out the necessary maneuvers or providing him with confirmation of the proper functioning of an operative automation system.

Thus the indications in relation to the reference frame may be "situation" or "tendency" pictures, such that a growing image indicates a reduction in altitude and vice versa, that an upwardly located picture that is deforming to tend towards a rectangle indicates that the aircraft is "too high" in relation to the correct descent plane, and that a downwardly located picture that is deforming to tend towards a triangle indicates that the aircraft is "too low," the picture displayed being naturally obtained by synthesizing all the above indications considered singly.

The system according to this invention is characterized in that the synthesized picture produced from a light source (which may be of any convenient kind) is deflected a first time vertically by a mirror mounted in a galvanometric coil, then deflected a second time horizontally by another mirror mounted in another galvanometric coil, while its structural distortion is obtained by appropriate distorting optics (the distortion being proportional to the rotation angles of the mirrors) and its magnification is produced by special second optics placed in a third galvanometric coil, electrical commands being generated by conventional intermediate devices from data provided for instance by the onboard receivers or Instrument Landing System (ILS) and the radio-altimeter and being applied furthermore to the first, second and third galvanometric coils respectively.

The description which follows, with reference to the accompanying nonlimitative exemplary drawings, of a preferred form of embodiment will give a clearer understanding of how the invention can be carried into practice. In accordance with this embodiment, a system based on galvanometers and optics projects in front of the aircraft cockpit window, before the pilot, a synthesized picture of the runway reconstituted for his benefit, this picture having to be correlated with a fixed reference frame in such manner that the composite picture (evolving picture and fixed frame) be of such quality and so located as to make it readily acquirable by the pilot.

Generally speaking, the flight phase of the aircraft considered hereinafter will be the precision landing based on information supplied from a conventional ground-based ILS system.

In order to facilitate the pilot's task, either in monitoring the autopilot or in manual piloting properly speaking (including manual takeovers following failure of the autopilot), the present invention proposes to provide him with a suitable synthesized head-up display of the situation of the aircraft in relation to the runway.

Figure 1:
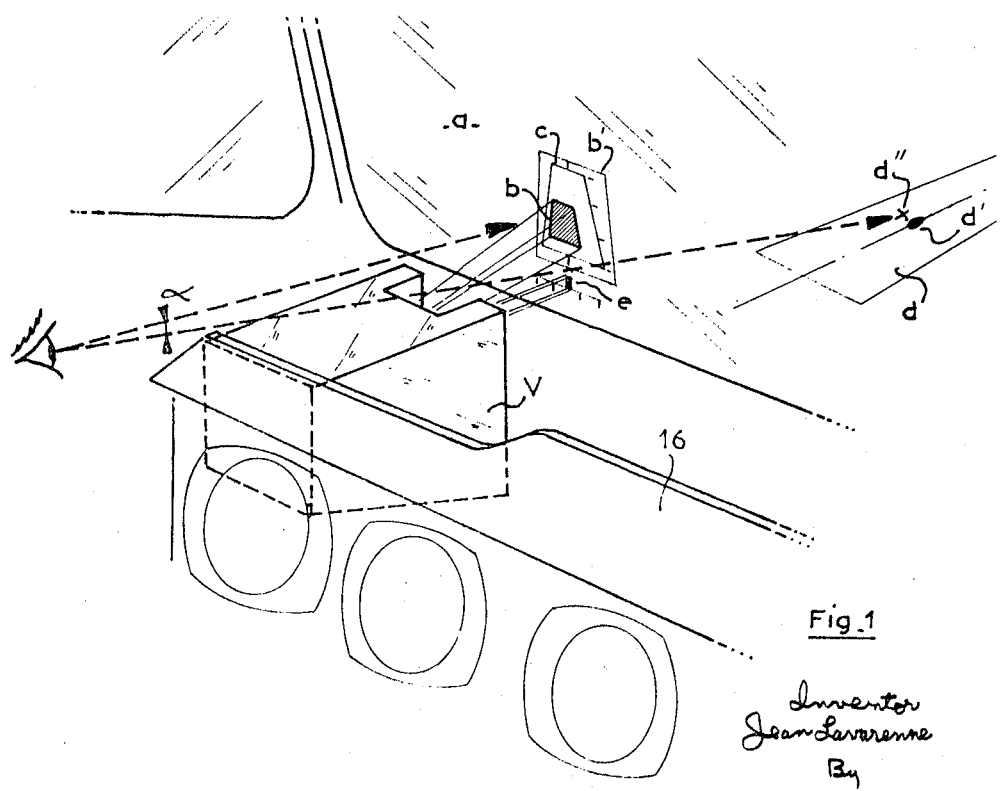
FIG. 1 is a perspective showing of the underlying principle of the subject method of this invention.

Accordingly, as shown in FIG. 1, a device V produces, on the front cockpit window, a clear and intuitive picture $b$ of the situation of the aircraft in relation to a fixed reference frame $c$ representing the runway in an idealized configuration.

The image $b$ changes in size, shape and offset in relation to the reference frame $c$ so as to provide a suitable synthesis of such basic flight parameters as height above the runway (size of the image), deviation from the directional localizer (image shifted to the right or to the left) and deviation from the glide path (image shifted above or below, with distortion).

Other subsidiary data may also be added, such as an indication of the speed for example, given by a deviation to the right (speed higher than the selected speed) or to the left (speed lower than the selected speed) of a spot $e$ in accordance with the customary symbolization, or else of variations in longitudinal and transverse attitude by the motions of an airplane-shaped symbol (more familiarly known as a "bug"), or else of the "velocity vector" by means of additional galvanometers.

FIGS. 2 to 8 show the changes in the image $b$ in relation to the reference frame $c$ that are obtained with a suitable device V to be described in greater detail hereinafter, and the interpretation which the pilot must give to them in determining the position of the aircraft above the runway when it is correctly following the directional localizer and the glide path.

Figure 2:
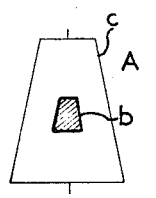
FIGS. 2 through 9 show elemental picture deflections and distortions.

FIG. 2 shows a small Type A picture which situates the aircraft at a relatively high altitude (500 meters for example).

Figure 3:
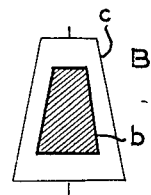

FIG. 3 shows a larger Type B picture which situates the aircraft at a relatively low altitude (100 meters for example).

Figure 4:
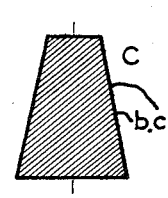

FIG. 4 shows a Type C picture in which registry between $b$ and $c$ indicates zero altitude, or touchdown.

Figure 5:
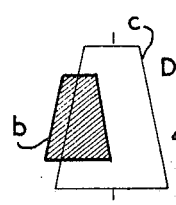
Figure 6:
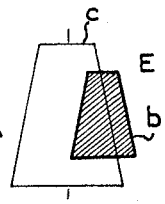

FIG. 5 shows a Type D picture indicating a misalignment to the left, and FIG. 6 a Type E picture indicating a misalignment to the right, in relation to the ILS glide path, the aircraft being at an altitude of 100 meters and following a correct glide path angle.

Figure 8:
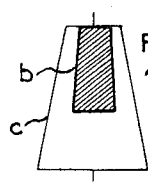
Figure 7:
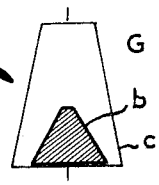

FIG. 7 is a Type G picture which indicates a "too low" glide path; and FIG. 8 a Type F picture which indicates a "too high" glide path, the aircraft being at an altitude of 100 meters and properly aligned directionally.

The pilot is then able to take suitable action on the basis of the above information. In cases where the pictures are of the "tendency" type rather than the "situation" type, the pilot's task is facilitated.

Figure 9:
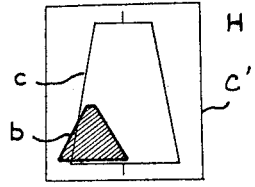

By way of example and in order to clearly show the synthesization possibilities of the image b, FIG. 9 represents a picture H of the B–D–G type indicating here a case of "situation" pictures, namely a misalignment to the left, an undershoot and an altitude of 100 meters. It is to be noted that a "safety envelope" frame c' may be added to reference frame c in order to indicate the degree of picture offset not to be exceeded, irrespective of the direction.

Referring next to FIG. 1, it will be manifest therefrom that the pilot will have in his direct field of vision α not only the runway d when atmospheric conditions make this possible, but also the ideal touchdown point d' and the probable touchdown point d" obtained by his interpretation of the position of image b in relation to frame c, and that he can if necessary attempt to correct his flight path.

Figure 10:
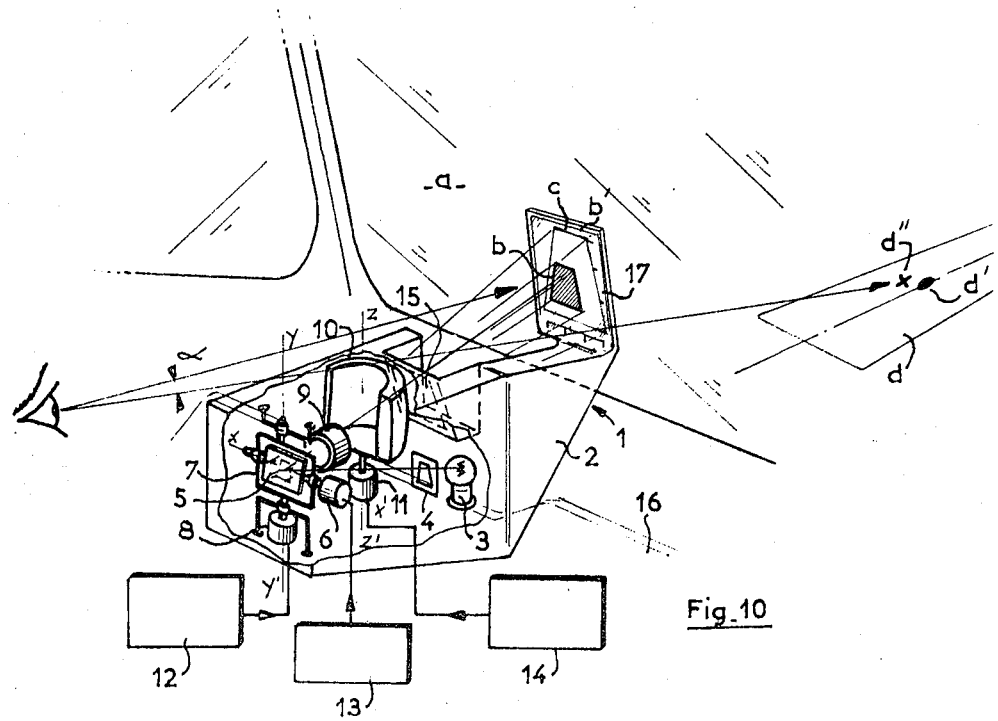
FIG. 10 is a perspective and partly exploded showing of a preferred form of embodiment of the system according to this invention.

Although the "picture" information produced on the cockpit window in accordance with this invention can be obtained from any convenient means, FIG. 10 illustrates a preferred nonlimitative exemplary embodiment of the invention which utilizes optical and galvanometric means on the basis of the electrical information provided by the standard detecting means available on the aircraft.

The system shown in FIG. 10, which is generally designated by reference numeral 1, basically includes a housing 2, a light source 3, a diaphragm 4 to form a trapezoidal image, a moving-coil mirror 5 rotatable by drive means 8, a visor with distorting optics 9 and a special optical element with variable magnification 10 rotatably by drive means 11.

The rotation systems 8, 6 and 11 are additionally energized electrically by intermediate elements which adapt the signals from the customary units integrated into the ILS "directional localizer," "glide path" and "radio-altimeter" channels 12, 13 and 14 respectively.

Lastly, the housing 2 is formed with a window 15 for passage of the light beam, and its shape coupled with the compactness of the component parts are such that it can readily be positioned behind the instrument panel 16 without hindering the adjoining instruments whose locations have been schematically depicted.

A description will now be given of the theory of operation of the system 1 shown in FIG. 10.

The light source 3 throws on mirror 5 a trapezium-shaped image the contour of which is bounded by the diaphragm or mask 4 (or else by partially blackening the mirror 5). This image is then reflected along the axes x–x' and y–y' according to the electrical information received from 12 and 13, by means of the arrangement shown in FIG. 10, and a special optical device 9 so distorts this image that its structural pattern changes continually from a triangular shape in the bottom position to a rectangular shape in the top position.

The image then passes through a further special optical device 10 capable of being swiveled about the axis z–z' by the drive means 11 in response to electrical information from the radio-altimeter adapting unit 14, in such manner that the degree of magnification of the image be made proportional to the degree of rotation of said optical device, i.e., to the altitude of the aircraft.

The image is thereafter formed either directly on the suitably treated cockpit window or on a semitransparent sheet of glass 17 fast with the housing 2 and positioned against said cockpit window.

Figure 11:
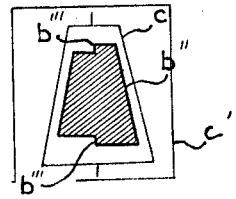
FIG. 11 shows a synthesized picture obtained with an alternative embodiment.

In accordance with an alternative image pattern, represented as at b" on FIG. 11, the special optical device 10 is formed by simple, individual cylindrical lenses arranged parallel to one another around and in the direction of axis z–z' and it is possible to produce indents b"' referenced to the rightward or leftward transit of the lenses whereby to establish the sense of the change in magnification of the image b".

Similarly, in accordance with another variant, the diaphragm 4 can distort the light beam by suitable pivoting motion in order to arrive at the synthesized picture defined in the subject method of this invention.

It goes without saying that the system depicted in FIG. 10 is given solely for nonlimitative exemplary purposes, as a simple and feasible way of carrying the method according to the invention into practice.

In the same spirit, it will be manifest that the picture obtained in the pilot's field of vision, representing a synthesis of the elemental images defined in the method, could be generated by any other convenient means and more particularly by optical means differing not only in respect of the path followed by the light beam but also in respect of the magnification and distortion process, or else by electronic means for distorting the image produced on a cathode-ray tube. Broadly speaking. all variants performed in the spirit of the present invention would remain within the scope thereof.

I claim:

1. A method of assisting an aircraft pilot, notably during the approach and precision landing phase in inadequate visibility comprising the steps of
   positioning a receptacle having a fixed reference frame thereon symbolizing a runway in the pilot's direct field of vision in a line of sight other than the pilot's line of sight with the actual runway;
   projecting a changing real image representing the runway on which the pilot is to land, on said receptacle;
   and controlling the changes of said changing image in accordance with electrical information supplied from conventional instrument landing system instruments on board the aircraft.

2. The method of claim 1 further characterized by
   modifying the area of the changing image in relation to the unchanging area of the fixed reference frame in accordance with changes in the altitude of the aircraft;
   modifying the lateral displacement of the changing image in respect to the fixed reference frame in accordance with changes in the directional alignment of the aircraft with the runway;
   modifying the contour of the changing image in accordance with alignment of the aircraft along the glide slope evolving from a rectangular shape when the aircraft is too high towards a triangular shape when the aircraft is too low.

3. The method of claim 1, further characterized by
   delineating a second outer frame around said first frame showing the safety envelope not to be overshot.

4. The method of claim 1, further characterized by
   supplying supplemental information outside and adjacent the contour of the reference frame projected in the form of luminous spots indicative of aircraft attitude and velocity vector.

5. A system for generating a synthesized display, not collimated to infinity, for helping an aircraft pilot, notably during the approach and precision landing phase in inadequate visibility, comprising:
   a receptacle bearing a fixed reference frame symbolizing a runway, said receptacle being positioned in the pilot's direct field of vision;
   a light source defining a beam of light;
   a trapezium-shaped diaphragm placed in the path of said beam and defining the contour of the image of a runway;
   a movable mirror having two pivotal axes, for receiving and reflecting the runway image;
   means for selectively rotating the movable mirror about is pivotal axes;
   distorting optical means for receiving the image reflected by the movable mirror;
   said optical means continuously modifying the contour of the image received to make it tend toward a downward triangular shape or an upward rectangular shape;
   special optical magnification means for receiving the image from the distorting optical means and projecting it on said receptacle bearing the fixed reference frame placed in the pilot's direct field of vision;
   whereby the synthetic combined perception of the changing image and the fixed reference frame provides the pilot with clear and intuitive indications enabling him to carry out the necessary maneuvers or providing him with confirmation of the correct functioning of an operative automation device.

6. A system as claimed in claim 5, wherein the receptacle is the front cockpit window suitably treated locally so as to be rendered semi-reflective.

7. A system as claimed in claim 5, wherein the receptacle is a semitransparent sheet of glass placed against the cockpit window.

8. A system as claimed in claim 5, wherein the movable mirror reflecting the runway image toward the distorting optical means is capable of being rotated about two mutually orthogonal axes, the one vertical and the other horizontal, by drive means responsive to the electrical data issuing from adapter means electrically connected to the onboard ILS receivers.

9. A system as claimed in claim 5, wherein the special optical magnification means provides variable magnification and is capable of being rotated about an axis by drive means responsive to the electrical information issuing from the adapter means associated to the onboard radio-altimeter.

10. A system as claimed in claim 5, wherein the special magnification optical means provides variable magnification and is formed by individual lenses juxtaposed with one another and transiently generating a top image indent and a bottom image indent to inform the pilot of the sense in which the image magnification is evolving.

11. A system as claimed in claim 5, wherein the trapezium-shaped diaphragm defining the contour of the runway image is rendered movable.

* * * * *